(12) United States Patent
Solihin

(10) Patent No.: US 8,195,888 B2
(45) Date of Patent: Jun. 5, 2012

(54) MULTIPROCESSOR CACHE PREFETCH WITH OFF-CHIP BANDWIDTH ALLOCATION

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 455 days.

(21) Appl. No.: 12/408,075

(22) Filed: Mar. 20, 2009

(65) Prior Publication Data

US 2010/0241811 A1    Sep. 23, 2010

(51) Int. Cl.
*G06F 12/02* (2006.01)
*G06F 13/00* (2006.01)

(52) U.S. Cl. . 711/137; 711/129; 711/153; 711/E12.023; 711/E12.057; 712/207; 712/E9.047

(58) Field of Classification Search .......... None
See application file for complete search history.

(56) References Cited

U.S. PATENT DOCUMENTS

| | | | | |
|---|---|---|---|---|
| 6,959,374 | B2 * | 10/2005 | Schulz | 711/213 |
| 7,552,241 | B2 | 6/2009 | Ramey | |
| 7,640,399 | B1 | 12/2009 | Lepak et al. | |
| 7,853,755 | B1 | 12/2010 | Agarwal et al. | |
| 7,987,321 | B1 | 7/2011 | Agarwal et al. | |
| 2005/0076181 | A1 * | 4/2005 | Hsu | 711/137 |
| 2006/0265552 | A1 * | 11/2006 | Davis et al. | 711/137 |
| 2010/0274971 | A1 | 10/2010 | Solihin | |

OTHER PUBLICATIONS

Chang et al., "Cooperative Cache Partitioning for Chip Multiprocessors," 2007, Proc. of 21st annual Intl. Conf. on Supercomputing, pp. 242-252.

Guo et al., "A Framework for Providing Quality of Service in Chip Multi-Processors," Dec. 2007, Proc. of the 40th Annual IEEE/ACM Symposium on Microarchitecture, pp. 343-355.

Hsu et al., "Communist, Utilitarian, and Capitalist Cache Policies on CMPs: Caches as a Shared Resource," 2006, Proc. of the 15th Intl. Conf. on Parallel Architectures and Compilation Techniques, pp. 13-22.

Iyer et al., "QoS Policy and Architecture for Cache/Memory in CMP Platforms," Jun. 2007, Proc. of the ACM SIGMETRICS Conference on Measurement and Modeling of Computer Systems, pp. 25-36.

Nesbit et al. "Virtual Private Caches," 2007, Proc. of the 34th Intl. Symp. on Computer Architecture, pp. 57-68.

Qureshi et al., "Utility-Based Cache Partitioning: A Low-Overhead, High-Performance, Runtime Mechanism to Partition Shared Caches," 2006, Proc. of the 39th IEEE/ACM Intl. Symp. on Microarchitecture, pp. 423-432.

Kim, S. et al. "Fair Cache Sharing and Partitioning on a Chip Multiprocessor Architecture" InProc.of the Intl. Conf. on Parallel Architectures and Compilation Techniques, pp. 111-122, 2004.

Suh et al., "Analytical Cache Models with Applications to Cache Partitioning," 2001, In Proc. of the 15th Intl. Conf. on Supercomputing, pp. 1-12.

U.S. Notice of Allowance dated Oct. 3, 2011 in U.S. Appl. No. 12/428,563.

* cited by examiner

*Primary Examiner* — Reginald Bragdon
*Assistant Examiner* — Daniel Bernard
(74) *Attorney, Agent, or Firm* — Hope Baldauff Hartman, LLC

(57) ABSTRACT

Technologies are generally described for allocating available prefetch bandwidth among processor cores in a multiprocessor computing system. The prefetch bandwidth associated with an off-chip memory interface of the multiprocessor may be determined, partitioned, and allocated across multiple processor cores.

15 Claims, 5 Drawing Sheets

MULTIPROCESSOR CACHE PREFETCH WITH OFF-CHIP BANDWIDTH ALLOCATION

BACKGROUND

Multiprocessor systems integrate increasing numbers of processor cores onto a single integrated circuit chip. While the increasing number of processor cores may allow more processing capabilities for the integrated circuit chip, available bandwidth for off-chip resources (i.e., off-chip bandwidth) such as memory may not scale as quickly as the number of cores. Off-chip bandwidth may often be limited by the number of pins available for interfacing between the integrated circuit chip and its socket or printed circuit board. The limitation to the available off-chip bandwidth can manifest as latency between processor cores requesting and receiving access to external memory.

Some processors rely on prefetching to mitigate the latency of accesses to external memory. In prefetching, blocks of data are loaded from the external memory into a cache before the data is expected to be requested by the processor in the near future. While prefetching can reduce execution time of programs on the average, some prefetches are wasted because the prefetched blocks are not used before they are evicted from cache. With multiple cores sharing off-chip bandwidth, wasted prefetches may represent non-optimal use of limited off-chip bandwidth resources.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
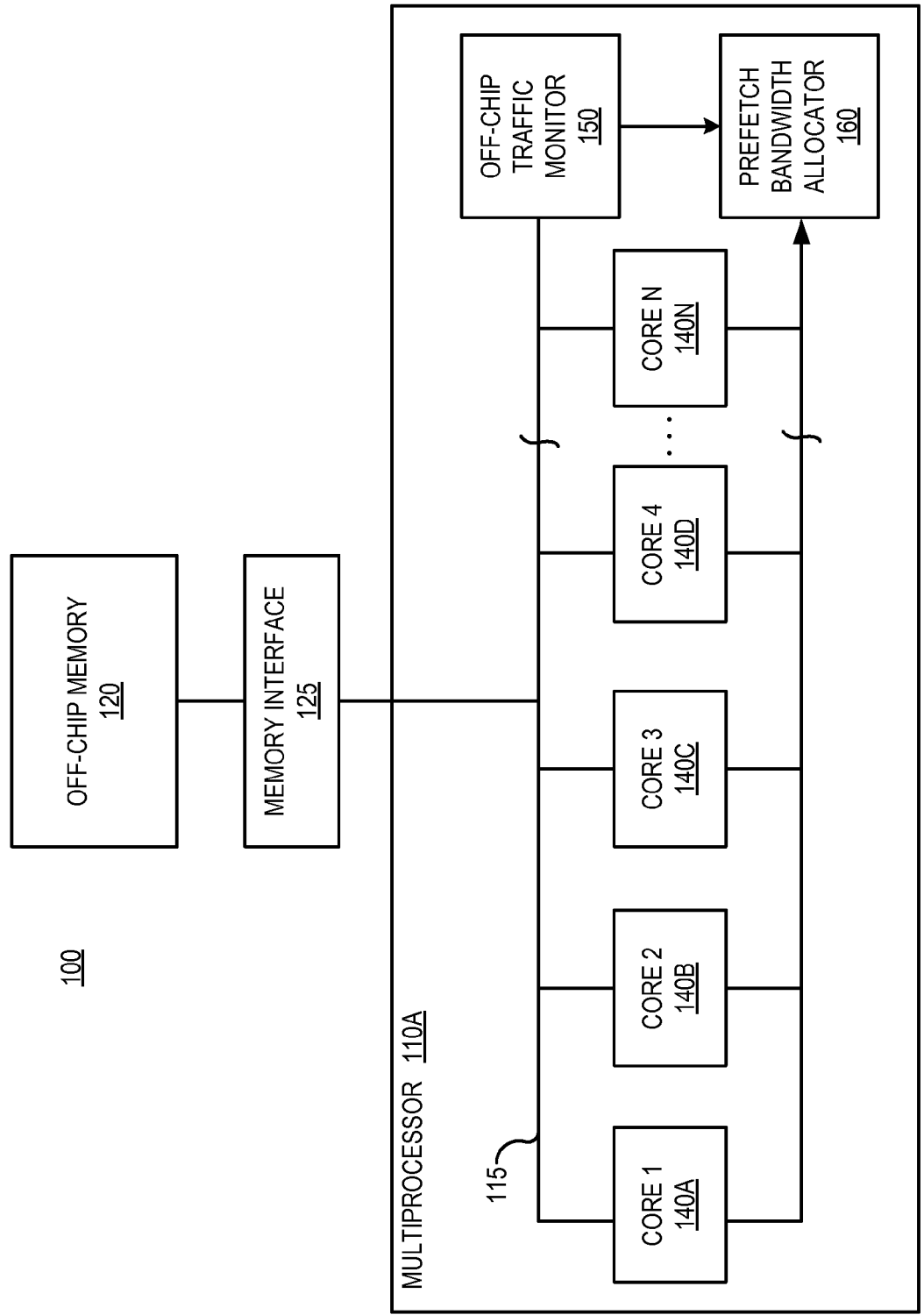
FIG. 1 is a functional block diagram illustrating a multiprocessor coupled to an off-chip memory.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to methods, apparatus, systems and computer program products related to improving off-chip bandwidth efficiency of cache prefetching in multiprocessors. Cache prefetches may be generated by different cores in a multicore system, and a portion of the available off-chip bandwidth may be allocated to those cores that have produced the most effective prefetches in the past. Cores may be assigned a prefetch efficacy score based on how useful and timely their prefetched blocks turn out to be. A core having a higher prefetch efficacy score may be allocated a larger portion of off-chip bandwidth for its future prefetch requests. In contrast, cores having a lower prefetch efficacy score may be allocated a reduced portion of off-chip bandwidth its future prefetch requests. Consequently, bandwidth may be allocated first, or in a larger proportion, to cores having the most effective prefetches.

In some examples, technologies are described for allocating prefetch bandwidth among the processor cores of a multiprocessor computing system. A prefetch bandwidth associated with an off-chip memory interface of the multiprocessor may be determined. A partition of the prefetch bandwidth across two or more processor cores of the multiprocessor may be established. Prefetch operations may be supported at each processor core of the multiprocessor to conform to the established partition of the prefetch bandwidth.

In some other examples, an off-chip traffic monitor module can monitor off-chip memory bandwidth associated with an off-chip memory bus. The off-chip traffic monitor can determine a non-prefetch bandwidth associated with the off-chip memory bus. A prefetch bandwidth allocator can calculate the prefetch bandwidth as a difference between a capacity bandwidth of the off-chip memory bus and the determined non-prefetch bandwidth. Prefetch efficacy scores associated with each respective processor core may be maintained. The prefetch bandwidth may be partitioned in proportion to the prefetch efficacy scores of the respective processor cores. The prefetch efficacy scores may be based on tallying a number of prefetched cache entries flagged as used prior to being evicted from a cache. The prefetch bandwidth may be represented by a token generation rate. Token bins may be used to track tokens allocated to a processor core. A token may be consumed in response to performing a prefetch operation.

Turning now to FIG. 1, a functional block diagram 100 illustrates a multiprocessor 110A coupled to an off-chip memory 120 according to at least some embodiments presented herein. The multiprocessor 110A may have multiple processor cores, such as core 1 through core N 140A-140D and 140N. These may be referred to collectively, or generally, as processor cores 140. The multiple processor cores 140 can generally support parallel processing, parallel tasks, parallel threads, separate sequential processes, or any combination thereof. The terms "multiprocessor" and "multi-core processor" maybe used interchangeably herein.

The off-chip memory 120 may be accessed by the multiprocessor 110A. The off-chip memory 120 may be referred to as the main-memory of the computing system. The multiprocessor 110A may read from and write to the off-chip memory 120. Such reads and writes may relate to both instructions and data associated with operations of the multiple processor cores 140 of the multiprocessor 110A. Generally, each of the processor cores 140 within the multiprocessor 110A may individually access the memory 120. The memory 120 may be random access memory (RAM), static RAM (SRAM), dynamic RAM (DRAM), synchronous DRAM (SDRAM), or any type of volatile or non-volatile memory. A memory interface 125 may support the interconnection between the multiprocessor 110A and the off-chip memory 120. The memory interface 125 may be a bridge, glue logic, a bus arbiter, a bus controller, a memory bank controller, one or more buses, or any other memory interface mechanism that may be used to interconnect memory and processors or multiprocessors. The memory interface 125 may be located on chip or off-chip. An off-chip memory bus 115 may interconnect the processor cores 140 and the memory interface 125 and the off-chip memory 120.

An off-chip traffic monitor 150 may be a module such as a circuit, a collection of circuits, or a state machine. The off-chip traffic monitor 150 may monitor traffic between the processor cores 140 and the off-chip memory 120. A portion of this traffic may be demand requests from the processor cores 140. Demand requests may be requests to force loading of instructions or data associated with current execution but not available in cache. A portion of the off-chip traffic may also be prefetch traffic. Code or data that is estimated, or assumed, to be requested by a processor core 140 in the near future may be prefetched and placed in a cache memory accessible by that processor core 140.

The off-chip traffic monitor 150 can monitor traffic going off-chip and observe the portion of off-chip bandwidth that is used by demand requests. From the amount of demand requests generated by the processor cores 140, the off-chip traffic monitor 150 may determine a remaining portion of available off-chip bandwidth. This remaining bandwidth may be allocated as prefetch bandwidth for performing prefetch operations with the off-chip memory 120.

The off-chip traffic monitor 150 may provide information regarding the prefetch bandwidth to a prefetch bandwidth allocator 160. The prefetch bandwidth allocator 160 may partition this prefetch bandwidth among the various processor cores 140. In some examples, the prefetch bandwidth allocator 160 may partition prefetch bandwidth by obtaining information regarding the prefetch efficacy of each processor core 140 and allocating prefetch bandwidth according to the relative prefetch efficacy scores of the processor cores 140.

The modules discussed herein may be implemented within integrated circuits. These integrated circuits may be application specific integrated circuits (ASICs), programmable integrated circuits such as field programmable gate arrays (FPGAs) or programmable logic arrays (PLAs), systems on chip (SOC), system on substrate, system on package, or implemented in any other reasonable approach for integrating or packaging circuitry. The processor cores 140 may be general purpose processors, digital signal processors (DSPs), application specific processors, reconfigurable processors, graphical processors, co-processors, cores within programmable logic, or any combination thereof. While illustrated and discussed as separate modules or circuits, the off-chip traffic monitor 150 and the prefetch bandwidth allocator 160 may be functionally combined in any combination or partitioned differently without departing from the spirit and scope of the technology disclosed herein. Together, the off-chip traffic monitor 150 and the prefetch bandwidth allocator 160 may be referred to as a bandwidth monitor and allocator module or system.

Figure 2:
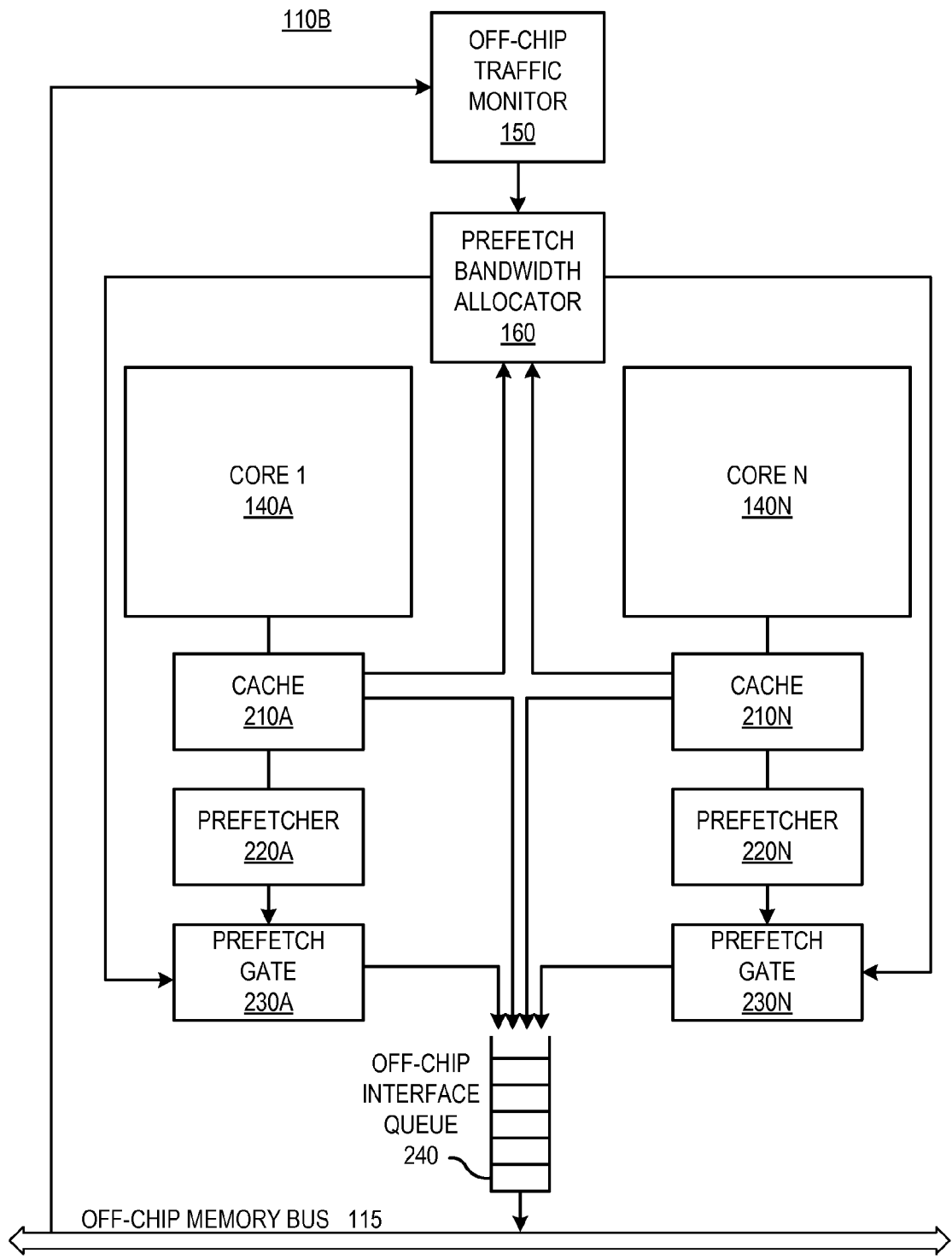
FIG. 2 is a block diagram illustrating a multi-core processor with a prefetch bandwidth allocator using prefetch gating.

Turning now to FIG. 2, a block diagram illustrates a multi-core processor 110B with the prefetch bandwidth allocator 160 using prefetch gating according to at least some embodiments presented herein. The multiprocessor 110B may have multiple processor cores 140, such as core 1, 140A, and core N, 140N. Each processor core 140 may be associated with one or more caches, such as cache 210A associated with processor core 1, 140A, and cache 210N associated with processor core N, 140N. These caches may be referred to collectively, or generally, as caches 210. Two or more processor cores 140 may also share a combined cache.

Generally, a cache, such as caches 210, can be a small, fast memory that may be configured to store frequently used, recently used, or soon to be used, blocks of memory for rapid access by a processor or processors. Thus, caches 210 may mitigate some of the latency associated with accessing main memory (not shown in FIG. 2). For example, read and write timing of main memory can be significantly slower than the internal timing of read and write operations for the processor 140 itself. In some examples, wait-states may be introduced into the operation of the processor 140 to accommodate latency of the external timing requirements for read and write operations. Alternatively, cache memory 210 may be utilized to reduce the total number of wait states and lower overall average latency.

Demand requests may be requests to force loading of instructions or data into the cache 210 that are associated with current execution by the processor 140. As such, demand requests may be viewed as non-optional requests to load code or data into cache 210. In contrast, prefetches can attempt to load code or data into cache 210 that has been estimated to be requested by the processor core 140 in the near future. As such, prefetches may be regarded as being somewhat optional; however, effective prefetches may significantly improve execution performance of a processor 140.

A prefetcher, such as a prefetcher 220A associated with processor core 1, 140A, and a prefetcher 220N associated with processor core N, 140N, may be configured to prefetch code or data into the cache 210 associated with the respective processor cores 140. These prefetchers may be referred to collectively, or generally, as prefetchers 220. Prefetch requests from a prefetcher 220 as well as demand requests may be sent to an off-chip interface queue 240. There may be a single global off-chip interface queue 240 or multiple off-chip interface queues operating in parallel. An off-chip interface queue 240 may be configured to buffer and order memory requests between the multi-core processor 110B and the off-chip memory bus 115.

The off-chip traffic monitor 150 may monitor traffic on the off-chip memory bus 115. A portion of this traffic may be demand requests from the caches 140. The off-chip traffic monitor 150 may observe the portion of off-chip bandwidth that is used by demand requests. The off-chip traffic monitor 150 can determine a remaining portion of off-chip bandwidth based at least in part on the amount of demand requests generated by the processor cores 140. The remaining off-chip bandwidth may be allocated as prefetch bandwidth for performing prefetches from the off-chip memory 120.

The off-chip traffic monitor 150 may provide information regarding the prefetch bandwidth to the prefetch bandwidth allocator 160. The prefetch bandwidth allocator 160 may partition this prefetch bandwidth among the various processor cores 140. In some examples, the partitioning of the available bandwidth may be accomplished by obtaining information from the processor cores 140 regarding the prefetch efficacy of each cache 210, and allocating prefetch bandwidth according to the obtained information of relative prefetch efficacy. An example metric of prefetch efficacy may be related to the number of prefetched cache entries that are used prior to being evicted. If more of the prefetched entries associated with a specific processor core 140 are actually used, it may imply that the prefetching associated with that processor core 140 are more effective than an instance where more of the prefetched entries go unused prior to eviction.

Each processor core 140, or related cache 210, may be associated with a prefetch gate 230. For example, prefetch gate 230A may be associated with processor core 1, 140A, while prefetch gate 230N may be associated with processor core N, 140N. These prefetch gates 230A, 230N may be referred to collectively, or generally, as prefetch gates 230. The prefetch bandwidth allocator 160 may signal the prefetch gates 230 to provide the prefetch gates 230 with the allocated partitions of the prefetch bandwidth. The prefetch gate 230 may limit prefetching according to the bandwidth allocation partition. In some examples, once the allocated bandwidth has been used up, additional prefetch requests may be ignored.

The functional operations of the prefetcher 220, the prefetch gate 230, and the prefetch efficacy scoring associated with each processor core 140 may be implemented as part of a cache controller (not shown). These functional operations may be integrated with the prefetch bandwidth allocator 160, or with the off-chip traffic monitor 150. The functional operations may be integrated together, fully distributed at each processor core 140, shared between subsets of the processor cores 140, or integrated or partitioned in any reasonable combination thereof.

Figure 3:
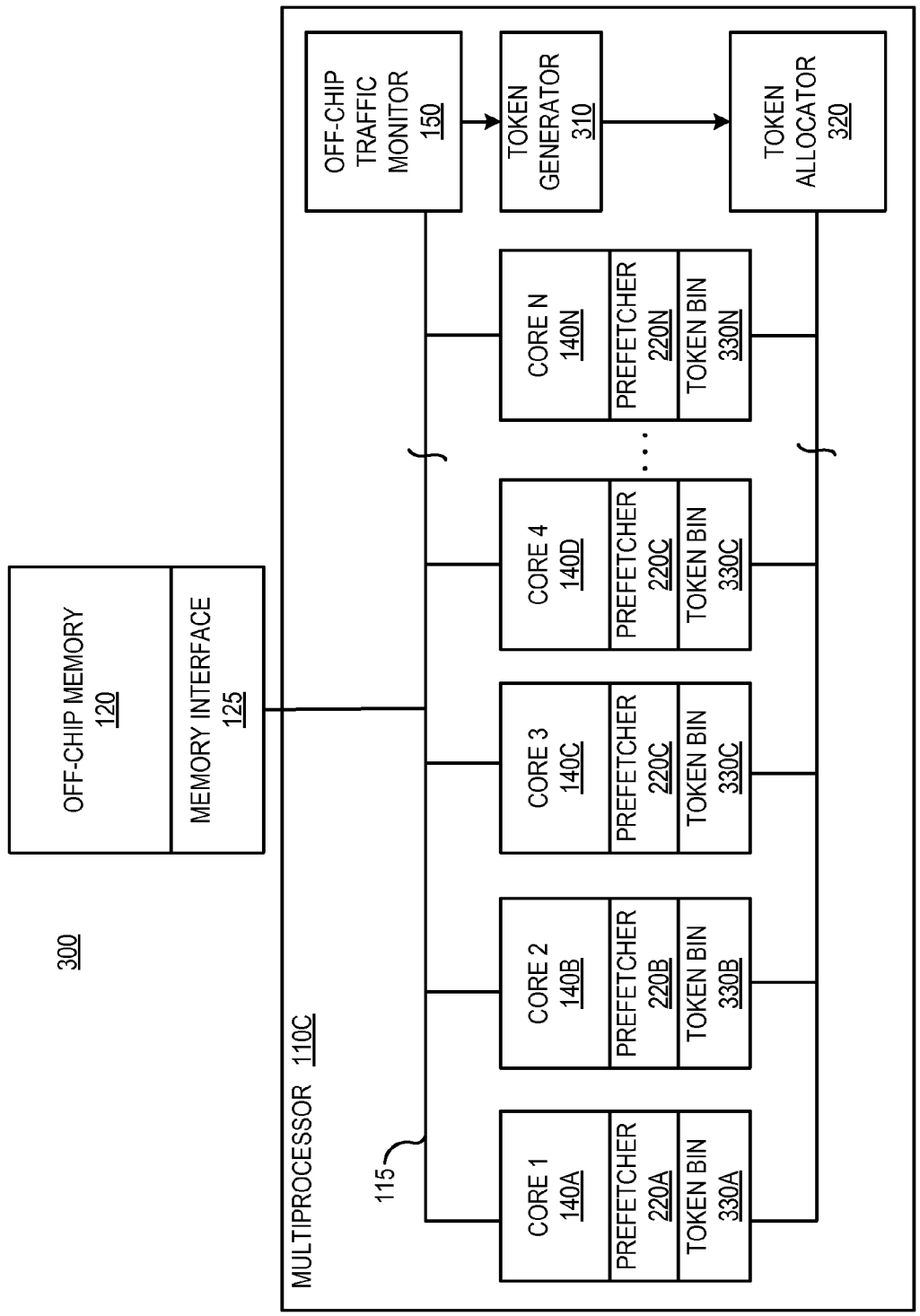
FIG. 3 is a block diagram illustrating a multiprocessor using token bins to allocate prefetch bandwidth.

Turning now to FIG. 3, a block diagram 300 illustrates a multiprocessor 110C using token bins 330 to allocate prefetch bandwidth according to at least some embodiments presented herein. The multiprocessor 10C may have multiple processor cores 140, such as core 1 through core N, 140A-140D and 140N. The off-chip memory 120 may be accessed by the multiprocessor 110C. The off-chip memory 120 may be referred to as the main-memory of the computing system. According to other embodiments, the off-chip memory 120 may be an external cache. The memory interface 125 may support the interconnection between the multiprocessor 110C and the off-chip memory 120. The off-chip memory bus 115 may interconnect the processor cores 140 and the memory interface 125 and the off-chip memory 120.

The off-chip traffic monitor 150 may monitor traffic between the processor cores 140 and the off-chip memory 120. A portion of this traffic may be demand requests from the processor cores 140. The off-chip traffic monitor 150 may monitor traffic on the off-chip memory bus 115 and observe the portion of off-chip bandwidth that is used by demand requests. From the amount of demand requests generated by the processor cores 140, the off-chip traffic monitor 150 may determine a remaining portion of off-chip bandwidth. This remaining available bandwidth may be allocated as prefetch bandwidth for performing prefetch read/write operations from the off-chip memory 120.

The off-chip traffic monitor 150 may be configured to provide information regarding the prefetch bandwidth to a token generator 310. The token generator 310 may establish a token generation rate based on the available bandwidth for total prefetches. An example token allocator 320 may partition this prefetch bandwidth among the various processor cores 140 by allocating the generated tokens to token bins 330 associated with the processor cores 140. Token bins, such as token bins 330A-330D and 330N, may receive token allocations from the token allocator 320. These token bins may be referred to collectively, or generally, as token bins 330.

The token allocator 320 may be configured to obtain information regarding the prefetch efficacy of each processor core 140. The token allocator 320 may allocate prefetch bandwidth according to the relative prefetch efficacy scores of the processor cores 140. For example, a cache (not shown in FIG. 3) that has demonstrated a higher prefetch effectiveness may be allocated more tokens, whereas a cache that has a lower prefetch effectiveness may be allocated fewer tokens.

A prefetcher 220, such as prefetcher 220A-220D and 220N, may be associated with each respective processor core 140. Requests from each prefetcher 220 may be filtered through the respective token bucket 330. When a prefetcher 220 receives a prefetch request and there is also a token available, the prefetcher 220 may consume the token and move to request to the off-chip interface queue 240. Otherwise, when the prefetcher 220 finds no token available, the prefetch request may be dropped or abandoned. Demand fetches, however, have a higher priority than prefetches and may be issued to the off-chip interface queue 240 without waiting for available tokens.

Figure 4:
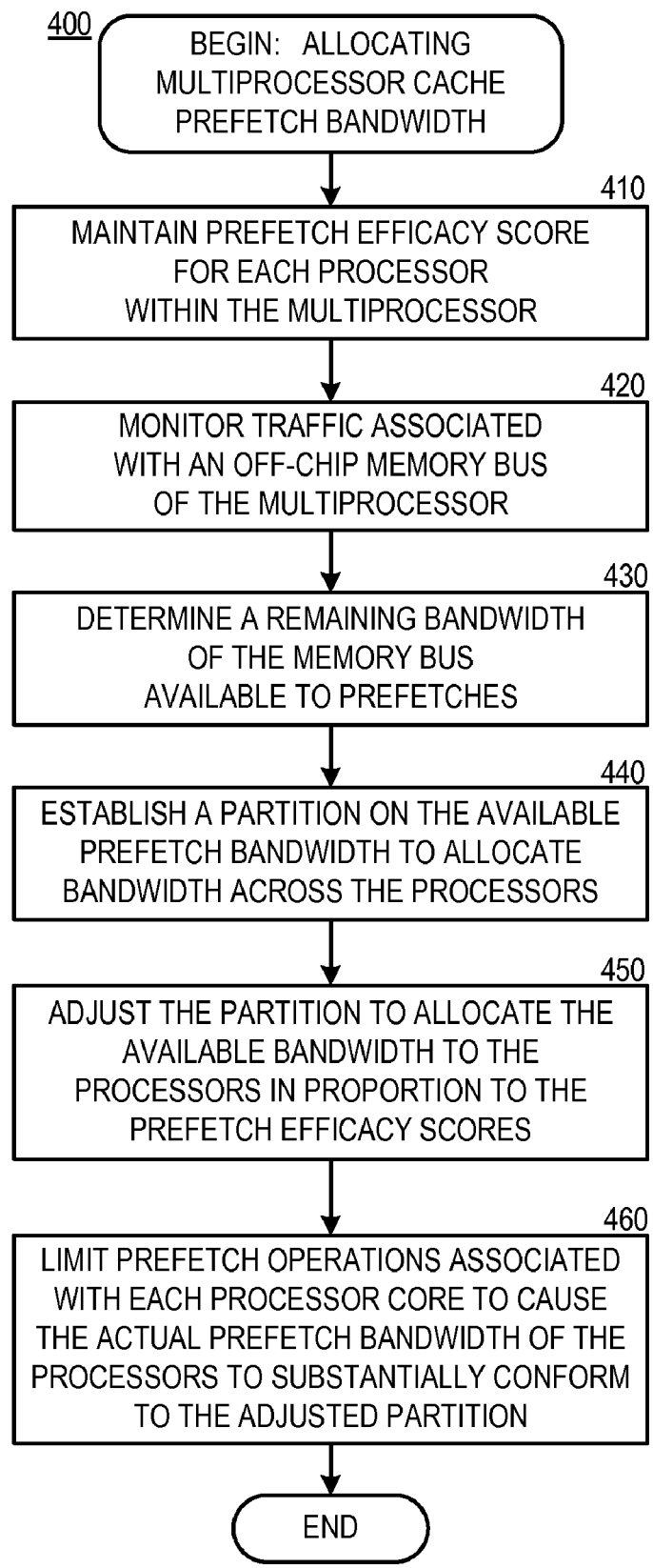
FIG. 4 is a flow diagram illustrating a process for allocating multiprocessor cache prefetch bandwidth.

Referring now to FIG. 4, additional details will be provided regarding the embodiments presented herein for multiprocessor cache prefetch with off-chip bandwidth allocation. In particular, FIG. 4 is a flow diagram illustrating a process 400 for allocating multiprocessor cache prefetch bandwidth according to at least some embodiments presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 400 begins at operation 410, where a prefetch bandwidth allocator 160 may maintain prefetch efficacy scores for each processor core 140 of a multiprocessor, such as the multiprocessors 110A-110C. The prefetch efficacy scores may also be maintained by a prefetcher 220, an off-chip traffic monitor 150, or a token allocator 320. The prefetch efficacy scores may be related to how many of the prefetched cache entries associated with respective processor cores 140 are used prior to being evicted. Some prefetched cache entries may end up being evicted without being used. This may occur when either the estimation of the need for the prefetched entry was incorrect or the estimation was not timely, for example by being too early. Such unused prefetch entries are wasted prefetch operations and may not be the most efficient use of the off-chip memory bus 115. The unused prefetches may be tallied up as indicators against the efficacy of the prefetches for that processor core 140. That is, the prefetches for that processor core 140 may be performing more poorly than others and thus may be assigned a lower prefetch efficacy score.

Prefetched cache entries may start out with a flag indicating that they have not been used. A cache controller associated with each cache 210 may modify the flag when the cache entry is used. When a cache entry is evicted from the cache 210 by the cache controller, the flags may be tallied up to determine the numbers of used and unused prefetch entries. A prefetch bandwidth allocator 160 or a token allocator 320 may determine a prefetch efficacy score. The prefetch efficacy score may be a percentage of prefetched cache entries that become used prior to eviction. A prefetch efficacy score may be a total number of cache entries that become used. A prefetch efficacy score may be a number of cache entries that become used within a specified time period. A prefetch efficacy score may be scaled or modified by a measure of time that a prefetched entry remains active within the cache 210 prior to eviction. Any other mechanism for placing a value on the effectiveness of prefetched cache entries may also be used alone, or in any combination with those described, to assign prefetch efficacy scores to the prefetching activities of the processor cores 140 within the multiprocessor 110.

Continuing to operation 420, an off-chip traffic monitor 150 may monitor traffic associated with the off-chip memory bus 115 of the multiprocessor 110. Information from the monitoring may support determining the bandwidth used by demand fetches or other non-prefetch cycles. This off-chip bandwidth may not be available for prefetching. The off-chip traffic monitor 150 may also monitor the total off-chip bandwidth. The total off-chip bandwidth may also be specified as a system parameter. These bandwidths may be monitored, or otherwise measured, as bits per second, bytes per second, words per second, cache transactions per second, block per second, bus transactions per second, bits per cycle, words per cycle, cache transaction per cycle, blocks per cycle, or any other measure of bandwidth.

Continuing to operation 430, a prefetch bandwidth allocator 160 may determine a remainder of the bandwidth of the off-chip memory bus 115 for allocation to prefetch activities. This remainder may be determined as the total off-chip bandwidth less the bandwidth used for non-prefetch activities such as demand fetches, writes, peripheral memory accesses, and so forth.

Continuing to operation 440, a prefetch bandwidth allocator 160 may establish a partition on the available prefetch bandwidth. The amount of prefetch bandwidth may be partitioned as a sum of N bandwidth units on N respective processor cores 140 where the sum of the N bandwidth units can equal the total available prefetch bandwidth. Thus, the partition can represent an allocation of the available prefetch bandwidth determined in operation 430 across the processor cores 140 of the multiprocessor 110.

Continuing to operation 450, the prefetch bandwidth allocator 160 may adjust the partition established in operation 440 to allocate the available prefetch bandwidth across the processor cores 140 in proportion to the prefetch efficacy scores maintained in operation 410. The proportional allocation may be made according to a linear proportioning or a weighted proportioning. For example, the proportions may be weighted to skew the allocation towards processors showing higher effectiveness in some embodiments. Thus, the prefetch bandwidth may be reallocated such that processor cores 140 having more effective prefetches can consume more of the available prefetch bandwidth. This reallocation may improve overall system performance by rewarding processor cores 140 making effective prefetches with the opportunity to perform additional prefetches.

In addition to prefetch efficacy scoring, other special factors may be used to adjust the partition according to embodiments. For example, an idle processor core 140, or one that is not actively prefetching, may turn down some of its allocated bandwidth. The prefetch bandwidth allocator 160 may apply such refused allocation from one processor core 140 to other processor cores 140.

Continuing to operation 460, a prefetch gate 230 may limit the prefetch operations performed at certain processor cores 140 to cause the actual prefetch bandwidth across all processor cores 140 to substantially conform to the partition as adjusted in operation 450. The process 400 can terminate after operation 460. According to some embodiments, the process 400 may also repeat continuously, or periodically, to adjust the prefetch bandwidth allocation over time as the relative prefetch efficacy scores may vary.

Figure 5:
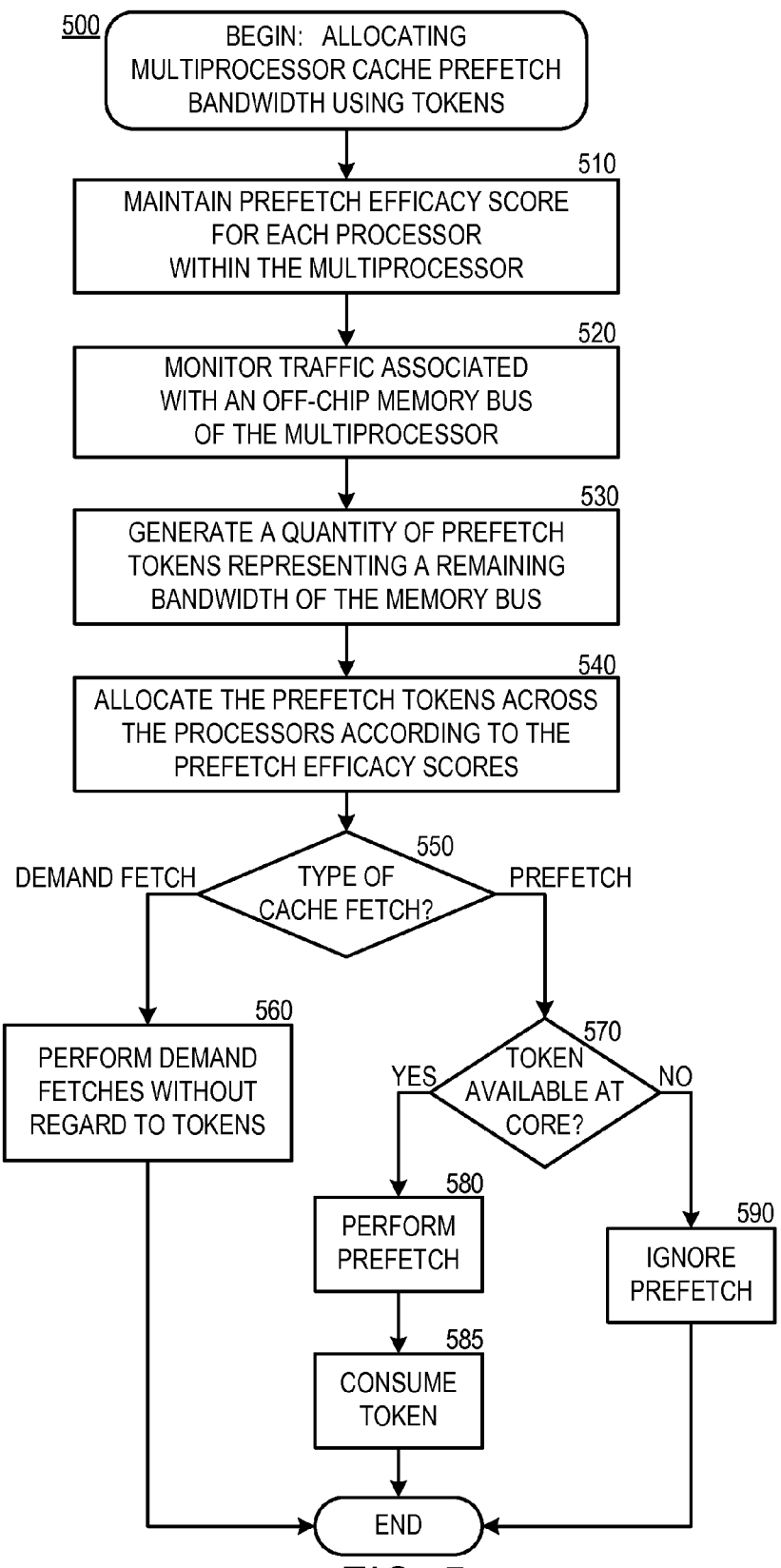
FIG. 5 is a flow diagram illustrating a process for allocating multiprocessor cache prefetch bandwidth using tokens, all arranged according to embodiments presented herein.

Referring now to FIG. 5, additional details will be provided regarding the embodiments presented herein for multiprocessor cache prefetch with off-chip bandwidth allocation. In particular, FIG. 5 is a flow diagram illustrating a process 500 for allocating multiprocessor cache prefetch bandwidth using tokens according to at least some embodiments presented herein.

Process 500 begins at operation 510, where a token allocator 320 may maintain prefetch efficacy scores for each processor core 140 of a multiprocessor, such as the multiprocessors 110A-110C. The prefetch efficacy scores may also be maintained by a prefetcher 220, an off-chip traffic monitor 150, or a prefetch bandwidth allocator 160. The prefetch efficacy scores may be related to how many of the prefetched cache entries associated with respective processor cores 140 are used prior to being evicted. Some prefetched cache entries may end up being evicted without being used. This may occur when either the estimation of the need for the prefetched entry was incorrect or the estimation was not timely, for example by being too early. Such unused prefetch entries are wasted prefetch operations and may not be the most efficient use of the off-chip memory bus 115. The unused prefetches may be tallied up as indicators against the efficacy of the prefetches for that processor core 140. That is, the prefetches for that processor core 140 may be performing more poorly than others and thus may be assigned a lower prefetch efficacy score.

Prefetched cache entries may start out with a flag indicating that they have not been used. A cache controller associated with the cache 210 may modify the flag if the cache entry is used. When the cache controller evicts the cache entry from the cache 210, the flags may be tallied up to determine the number of used and unused prefetch entries. A token allocator 320 may determine a prefetch efficacy score as a percentage of prefetched cache entries that become used prior to eviction. The prefetch efficacy score may be a total number of cache entries that become used. The prefetch efficacy score may be a number of cache entries that become used within a specified time period. The prefetch efficacy score may be scaled or modified by a measure of time that a prefetched entry remains active within the cache 210 prior to eviction. Any other mechanism for placing a value on the effectiveness of prefetched cache entries may also be used alone, or in any combination with those described, to assign prefetch efficacy scores to the prefetching activities of the processor cores 140 within the multiprocessor 110.

Continuing to operation 520, an off-chip traffic monitor 150 may monitor traffic associated with an off-chip memory bus 115 of the multiprocessor 110. The off-chip traffic monitor 150 may use information related to monitoring the traffic to determine the bandwidth used by demand fetches or other non-prefetch cycles. This off-chip bandwidth may not be available for prefetching. The off-chip traffic monitor 150 may also monitor the total off-chip bandwidth. The total off-chip bandwidth may also be specified as a system parameter. These bandwidths may be monitored, or otherwise measured, as bits per second, bytes per second, words per second, cache transactions per second, block per second, bus transactions per second, bits per cycle, words per cycle, cache transaction per cycle, blocks per cycle, or any other measure of bandwidth.

Continuing to operation 530, a token generator 310 can generate a quantity of prefetch tokens. The quantity of tokens can represent a remainder of the bandwidth of the off-chip memory bus 115. This remainder may be determined for allocation to prefetch activities. This remained may be determined as the total off-chip bandwidth less the bandwidth used for non-prefetch activities such as demand fetches, writes, peripheral memory accesses, and so forth. The token generator 310 may generate tokens to represent the total prefetch bandwidth as the number of cache prefetches that may be performed in a specified time period. For example, tokens may be generated on a periodic timer interval. In that example, the quantity of tokens generated would represent the prefetch bandwidth estimated to be available for the next iteration period of token generation as the number of cache prefetches that can be supported during that time period.

Continuing to operation 540, the token allocator 320 can allocate the prefetch tokens may be among the respective processor cores 140. This allocation may be made in proportion to the prefetch efficacy scores associated with the processor cores 140. The proportional allocation may be made according to a linear proportioning or a weighted proportioning. For example, the proportions may be weighted to skew the allocation towards processors showing higher effectiveness in some embodiments. Thus, the available prefetch bandwidth determined in operation 430 may be allocated across the processor cores 140 of the multiprocessor 110.

Continuing to operation 550, the prefetcher 220 or the memory interface 125 can determine if a cache fetch operation is a prefetch or a demand fetch. If a cache fetch is a demand fetch, the process 500 may continue to operation 560 where the demand fetch may be performed by a cache controller associated with the cache 210. The demand fetch may be performed without regard to tokens.

If a cache fetch is determined at operation 550 to be a prefetch, then the process 500 continues to operation 570. At operation 570, the prefetcher 220 can determine if there is a token available in the token bin 330 associated with the respective core. If a token is available at operation 570, then the process 500 continues to operation 580 where the prefetcher 220 may perform the prefetch operation. Continuing to operation 585, the token that was identified in operation 570 is consumed to account for the prefetch that was performed at operation 580.

When no token is available at operation 570, the process 500 continues to operation 590 where the prefetcher 220 can ignore or drop the prefetch request. The process 500 can terminate after operations 560, 585, or 590. The process 500 may also repeat continuously, or periodically, to adjust the prefetch bandwidth allocation over time as the relative prefetch efficacy scores may vary.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A multiprocessor system comprising:
    a first processor core;
    a second processor core;
    a first prefetcher associated with the first processor core;
    a second prefetcher associated with the second processor core;
    an off-chip memory interface supporting prefetch operations associated with the first prefetcher and the second prefetcher; and
    a prefetch bandwidth allocator configured to
        partition a prefetch bandwidth reserved for prefetching operations via the off-chip memory interface into a first prefetch bandwidth partition associated with the first prefetcher and a second prefetch bandwidth partition associated with the second prefetcher,
        maintain prefetch efficacy scores associated with each respective processor core, wherein the prefetch efficacy scores indicate an effectiveness of prefetching with each respective processor core, and
        re-partition the prefetch bandwidth associated with the off-chip memory interface into a third prefetch bandwidth partition associated with the first prefetcher and a fourth prefetch bandwidth partition associated with the second prefetcher, wherein the third prefetch bandwidth artition and the fourth refetch bandwidth partition are in proportion with the prefetch efficacy scores.

2. The multiprocessor system of claim 1, further comprising an off-chip traffic monitor operable to monitor the off-chip memory interface to determine a capacity bandwidth utilized by the first processor and the second processor core via the off-chip memory interface, determine a non-prefetch bandwidth utilized by the first processor core and the second processor core via the off-chip memory interface, and establish the prefetch bandwidth by subtracting the non-prefetch bandwidth from the capacity bandwidth.

3. The multiprocessor system of claim 1, wherein the prefetch efficacy scores are based on tallying a number of prefetched cache entries flagged as used prior to being evicted from a cache.

4. The multiprocessor system of claim 1, further comprising a token generator configured to generate tokens at a rate substantially proportional to the prefetch bandwidth.

5. The multiprocessor system of claim 4, further comprising a first token bin and a second token bin, wherein the first token bin is associated with the first prefetcher and configured to track a first number of tokens allocated to the first prefetcher and substantially proportional to the third prefetch bandwidth partition, and the second token bin is associated with the second prefetcher and configured to track a second number of tokens allocated to the second prefetcher and substantially proportional to the fourth prefetch bandwidth partition, wherein the first prefetcher decrements the first number of tokens for each prefetch operation performed by the first prefetcher, and wherein the second prefetcher decrements the second number of tokens for each prefetch operation performed by the second prefetcher.

6. The multiprocessor system of claim 4, wherein a token is removed from a token bin in response to a prefetch operation.

7. The multiprocessor system of claim 4, wherein the prefetcher ignores a prefetch request in response to a number of remaining tokens being zero.

8. A method for allocating prefetch bandwidth for a multiprocessor arranged to access off-chip memory over an off-chip memory bus, the method comprising:
    determining the prefetch bandwidth reserved for prefetching operations via the off-chip memory bus for access to the off-chip memory with an off-chip traffic monitor;
    partitioning the prefetch bandwidth into initial partitions across two or more processor cores associated with the multiprocessor with a prefetch bandwidth allocators;
    maintaining prefetch efficacy scores associated with each of the processor cores, wherein the prefetch efficacy scores indicate an effectiveness of prefetching with each respective processor core; and
    re-partitioning the prefetch bandwidth into updated partitions across the two or more processor cores, wherein the re-partitioning is in proportion with the prefetch efficacy scores.

9. The method of claim 8, wherein determining the prefetch bandwidth comprises:
    determining a capacity bandwidth utilized by the processor cores via the off-chip memory bus;
    monitoring an off-chip memory bandwidth utilized by the processor cores via the off-chip memory bus to determine a non-prefetch bandwidth associated with the off-chip memory bus; and
    determining the prefetch bandwidth by subtracting the non-prefetch bandwidth from the capacity bandwidth.

10. The method of claim 8, wherein the prefetch efficacy score is based on tallying a number of prefetched cache entries flagged as used prior to being evicted from a cache by a cache controller.

11. The method of claim 8, further comprising generating tokens at a rate proportional to the prefetch bandwidth with a token generator.

12. The method of claim 8, further comprising tracking tokens allocated to a processor core with a token bin.

13. The method of claim 8, further comprising removing a token from a token bin in response to performing a prefetch operation.

14. A multiprocessor comprising:
    a first processor core;
    a second processor core;
    a first prefetcher associated with the first processor core;
    a second prefetcher associated with the second processor core;
    an off-chip memory bus supporting prefetch operations associated with the first prefetcher and the second prefetcher;
    an off-chip traffic monitor operable to determine a non-prefetch bandwidth utilized by the first processor core and the second processor core via the off-chip memory bus; and a prefetch bandwidth allocator configured to
calculate a prefetch bandwidth reserved for prefetching operations as a difference between a capacity bandwidth utilized by the first processor core and the second processor core via the off-chip memory bus and the determined non-prefetch bandwidth,
partition the prefetch bandwidth between the first prefetcher and the second prefetcher,
maintain prefetch efficacy scores associated with each respective processor core, wherein the prefetch efficacy scores indicate an effectiveness of prefetching with each respective processor core, and
re-partition the prefetch bandwidth between the first prefetcher and the second prefetcher, wherein the re-partition is in proportion with the prefetch efficacy scores.

15. The multiprocessor of claim 14, further comprising two or more token bins, wherein the prefetch bandwidth is represented by a token generation rate, and each token bin is associated with a respective prefetcher and configured to track tokens allocated to the respective prefetcher.

* * * * *

UNITED STATES PATENT AND TRADEMARK OFFICE
CERTIFICATE OF CORRECTION

PATENT NO. : 8,195,888 B2  
APPLICATION NO. : 12/408075  
DATED : June 5, 2012  
INVENTOR(S) : Solihin Page 1 of 1

It is certified that error appears in the above-identified patent and that said Letters Patent is hereby corrected as shown below:

On the Title Page, in Field (56), under "OTHER PUBLICATIONS", in Column 2, Line 18, delete "InProc.of" and insert -- In Proc. of --, therefor.

In Fig. 3, Sheet 3 of 5, delete " 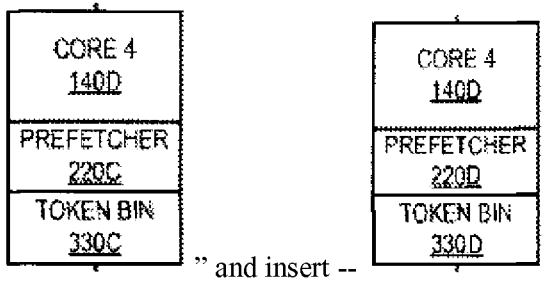 " and insert -- -- , therefor.

In Column 5, Line 28, delete "10C" and insert -- 110C --, therefor.

In Column 6, Line 8, delete "prefecther" and insert -- prefetcher --, therefor.

In Column 11, Line 41, in Claim 1, delete "artition and the fourth refetch" and insert -- partition and the fourth prefetch --, therefor.

In Column 12, Line 22, in Claim 8, delete "allocators;" and insert -- allocator; --, therefor.

Signed and Sealed this  
Twenty-fifth Day of September, 2012

David J. Kappos  
*Director of the United States Patent and Trademark Office*